United States Patent
Kirchner

(10) Patent No.: US 10,346,717 B1
(45) Date of Patent: Jul. 9, 2019

(54) SYSTEM AND METHOD FOR THRESHOLDING OF LOCAL IMAGE DESCRIPTORS

(71) Applicant: The United States of America as Represented by the Secretary of the Navy, Washington, DC (US)

(72) Inventor: Matthew R. Kirchner, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 220 days.

(21) Appl. No.: 15/491,680

(22) Filed: Apr. 19, 2017

(51) Int. Cl.
*G06K 9/46* (2006.01)
*G06K 9/62* (2006.01)

(52) U.S. Cl.
CPC ......... *G06K 9/6212* (2013.01); *G06K 9/4671* (2013.01); *G06K 9/6267* (2013.01); *G06K 2009/4666* (2013.01)

(58) Field of Classification Search
CPC .. G06K 9/6202; G06K 9/6201; G06K 9/6212; G06K 9/0061; G06K 9/00147; G06K 9/00758; G06T 7/00; G06T 7/174
See application file for complete search history.

(56) References Cited

U.S. PATENT DOCUMENTS

| 9,881,084 B1* | 1/2018 | Robertson ............... G06F 16/70 |
| 2018/0260415 A1* | 9/2018 | Gordo Soldevila ........................ G06K 9/4628 |

\* cited by examiner

*Primary Examiner* — Euengnan Yeh
(74) *Attorney, Agent, or Firm* — James M. Saunders

(57) ABSTRACT

Embodiments are directed to image matching using local image descriptors thresholding. An image matching tool is associated with at least one electronic processor. The image matching tool is configured to determine a unique bin magnitude threshold descriptor for a test image and an image of a known object of interest stored in a database. The image matching tool determines a classification match of the test image to the image of a known object of interest.

15 Claims, 5 Drawing Sheets

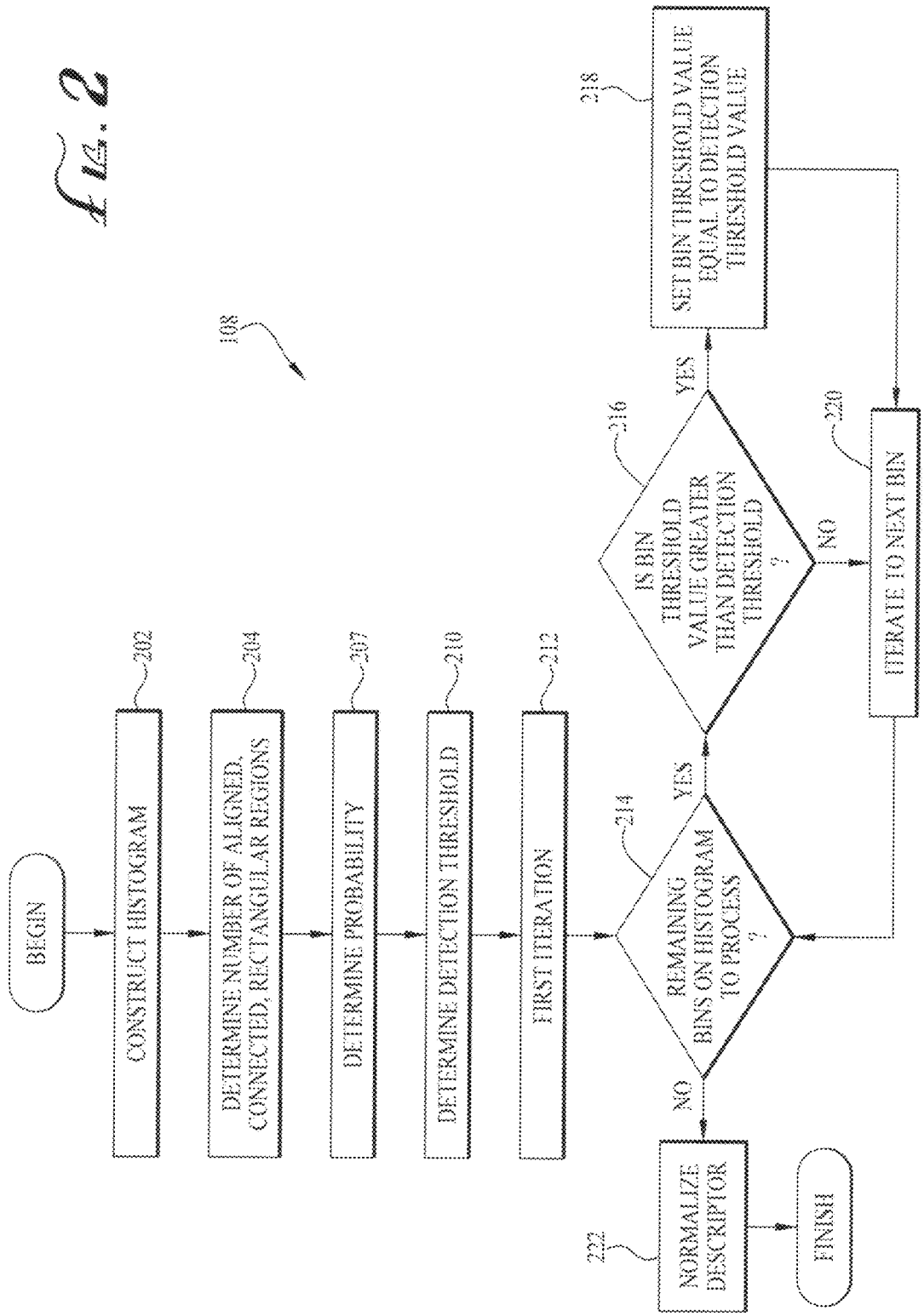

SYSTEM AND METHOD FOR THRESHOLDING OF LOCAL IMAGE DESCRIPTORS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

Embodiments generally relate to the detection of similar features in pixilated images.

BRIEF DESCRIPTION OF THE DRAWINGS

FIG. 2 is an exemplary flowchart depicting meaningful clamping tasks, according to some embodiments.

Figure 1A:
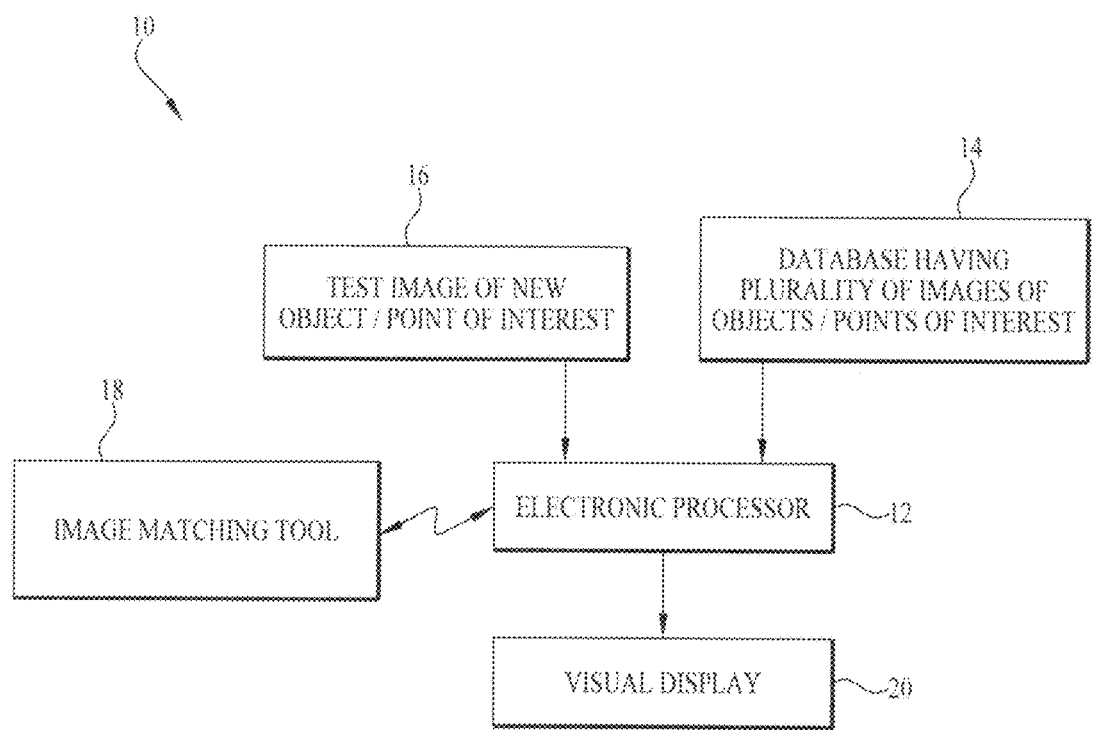
FIG. 1A is an exemplary system and its operational components for image matching, in accordance with some embodiments.

It is to be understood that the foregoing general description and the following detailed description are exemplary and explanatory only and are not to be viewed as being restrictive of the embodiments, as claimed. Further advantages will be apparent after a review of the following detailed description of the disclosed embodiments, which are illustrated schematically in the accompanying drawings and in the appended claims.

DETAILED DESCRIPTION OF EMBODIMENTS

Embodiments are directed to image matching by performing automatic thresholding of scale invariant feature transform (SIFT) descriptors. The descriptors are local descriptors, which are understood by a person having ordinary skill in the art to be histograms built from small patches or small regions of the images. Significant testing indicates that the disclosed embodiments improve matching performance by at least 15.9% on the Oxford image matching benchmark. Embodiments employ a contrario methodology to determine a unique bin magnitude threshold. This is accomplished by building a generative uniform background model for descriptors and determining when bin magnitudes have reached a perceptible level. The perceptible level is understood to be one that is high enough that it has deviated from randomness. An example is that the deviation away from uniform noise indicating that what is perceived could not have happened by chance.

Embodiments introduce a novel method called meaningful clamping (MC) to automatically threshold SIFT descriptors and improve on the idea of clamping by providing a rigorous process to compute the clamping threshold. The disclosed embodiments contrast from the current SIFT implementation, by efficiently computing a clamping threshold that is unique for every descriptor. This leads to significantly increased performance over existing clamping methods on a wide variety of image matching problems. Thus, the embodiments are noteworthy for at least two reasons. First, embodiments allow a computer to operate more efficiently. Second, the embodiments represent a significant technological advancement in the art of image matching. Instead of relying on an arbitrary threshold parameter value of c=0.2, which is the current practice in the art, embodiments determine a unique value which is applied to the image matching. The result is an improvement in image matching technology, especially with respect to illumination changes. The embodiments offer more robust and accurate determinations of nonlinear contrast changes, such as what is experienced when matching an infrared (IR) image to a visual spectrum image. Finally, the embodiments are also a significant improvement in the navigation field, especially for image-based navigation in global positioning system denied environments, abbreviated as GPS-denied environments.

Although embodiments are described in considerable detail, including references to certain versions thereof, other versions are possible. Examples of other versions include performing the tasks in an alternate sequence or hosting a program on a different platform. Therefore, the spirit and scope of the appended claims should not be limited to the description of versions included herein.

In the accompanying drawings, like reference numbers indicate like elements. FIG. 1A illustrates an exemplary system and its operational components according to the disclosed embodiments. Reference character 10 depicts the system, which may also be referred to as an apparatus, method, or a combination of both apparatus and method for shorthand purposes, without detracting from the merits or generality of embodiments.

The images are pixilated and sometimes referred to as digital images. The pixilated images can be provided by a common digital camera, mobile phone having a digital camera, or more sophisticated systems such as, for example, aerial sensor systems, video frames, and infrared (IR) images from long wave infrared cameras. Embodiments are directed to analysis of pixilated images. A person having ordinary skill in the art will recognize that a real image is an image taken in a scene by an actual physical camera of an actual physical object or location. Thus, embodiments are not directed to virtual or simulated images.

Embodiments generally relate to image matching systems and methods using local image descriptors thresholding, and include at least one electronic processor having a central processing unit 12. Local image descriptors thresholding compares two images based on statistical analysis. At least one database having a plurality of pixilated images of known objects of interest 14 is associated with the electronic processor 12. The database can be referred to as a database library. At least one test image of a new point or object of interest 16, is configured for input into the electronic processor 12. The test image 16 is also pixilated. The plurality of pixilated images of known objects of interest 14 can be referred to as a database image, at least one database image, and as a comparison image without detracting from the merits or generalities of the embodiments. The database image 14 is an image taken from an earlier time, $t_1$. The test image 16 is from an image taken at a later time, $t_2$.

An image matching tool 18 is associated with the electronic processor 18. Each image 14 & 16 has a collection of descriptors. Embodiments build a descriptor for both the test image 16 and the database image 14, initially without thresholding. The image matching tool 18 determines a unique bin magnitude threshold for each descriptor in each image 14 & 16. The image matching tool 18 provides a classification match of the test image 16 and the plurality of images of known objects of interest 14. Every pixel in each of the images 14 & 16 are sampled and the classification match is determined based on the analysis described below of sampled pixels in the images 14 & 16. The analysis is a patch by patch analysis of each image (14 & 16) to determine a match. In general, the classification match can be considered as a match in scene content between the database image 14 and the test image 16. At least one device 20 is associated with the electronic processor 12 and is configured to output the classification match in a tangible medium.

The embodiments disclosed can be used to determine a match by at least two ways. First, a match can be determined to exist in the scene content between two images (14 & 16) when the Euclidean distance is less than some threshold t. Any descriptor match is considered a correct match when the two detected features correspond. Using the ground truth homography mapping supplied with the dataset, features are considered to correspond when the area of intersection over union is greater than 50 percent. A second way to determine a match is by performing a pure nearest neighbor technique. The nearest neighbor technique identifies the closest features in structural similarities to other descriptor histograms.

In embodiments, the tangible outputs may be shown and/or represented as a visual display screen depiction (reference character 20 in FIG. 1A), hard copy printouts, as well as other media using classification/matching information such as, for example, a computer having computer-readable instructions that is configured to use output from the embodiments. Likewise, output can also be used for other systems for purposes including, for example, georeferencing, image-based navigation in a GPS-denied environment, intelligence, surveillance, and reconnaissance activities. A person having ordinary skill in the art will recognize that GPS is an acronym for global positioning systems. Thus, the embodiments can be used to support many different mission sets.

The visual display screen depiction 20 is sometimes referred to as a visual display monitor (screen) and is used to display a visual depiction of the classification match. In some applications, depending on the verification requirements, a visual verification by a user is important to provide an additional layer of validation before acting on the processing result. An example includes visual verification of a georeferenced location match prior to dedicating resources to a specific location based on the processing result.

Methods & Articles of Manufacture Embodiments

Figure 1B:
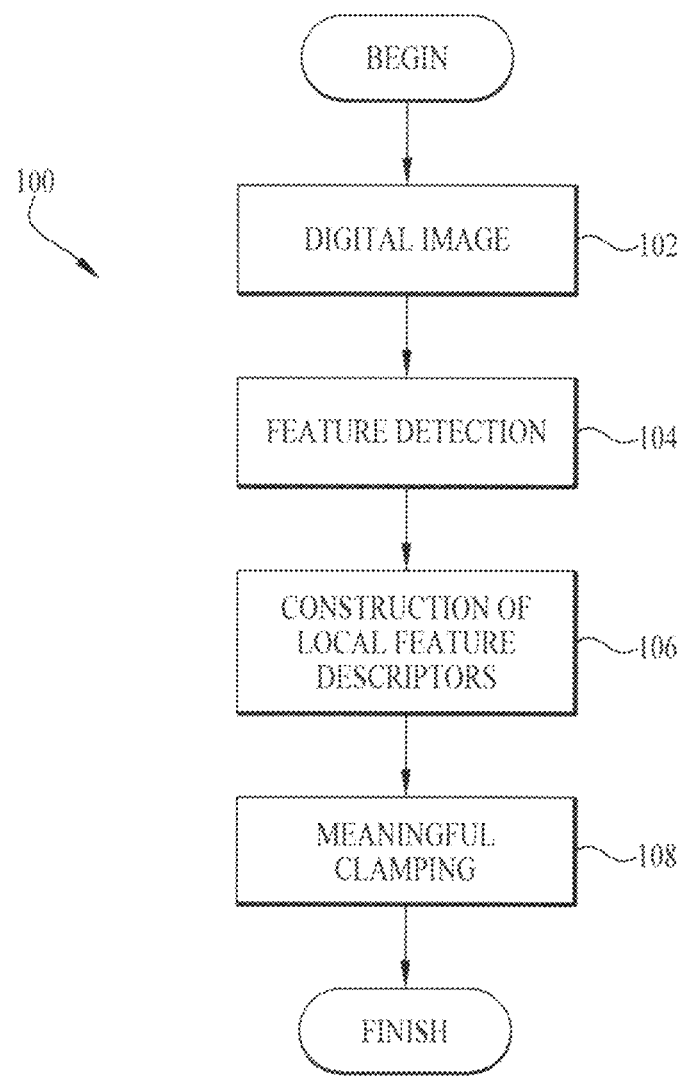
FIG. 1B is an exemplary flowchart depicting image matching tasks, according to some embodiments.

Both exemplary flowcharts in FIGS. 1B & 2 operate together to accomplish the overall task of image matching as disclosed herein and are equally applicable to both method and article of manufacture embodiments without detracting from the merits or generality of embodiments. Embodiments are directed to non-transitory electronic processor readable medium(s) having stored thereon electronic processor executable instructions that, when executed by the processor(s), cause the processor to perform the process(es) described herein. The electronic processor can sometimes be referred to as "processor," "computer," and other variations known in the art, without detracting from the merits or generalities of the embodiments.

The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk," CD-ROM, RAM, a PROM, an EPROM, a FLASH-EPROM, NOVRAM, any other memory chip or cartridge, a file server providing access to the programs via a network transmission line, and a holographic unit. Of course, those skilled in the art will recognize that many modifications may be made to this configuration without departing from the scope.

In some system embodiments, the electronic processor is co-located with the processor readable medium. In other system embodiments, the electronic processor is remotely located from the processor readable medium. It is noted that the processes/tasks described herein including the figures can be interpreted as representing data structures or sets of instructions for causing the computer readable medium to perform the process/task.

Certain embodiments may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations may be written in an object oriented programming language such as, for example, Python, Visual Basic, or C++. However, computer-usable/readable program instructions for carrying out operations may also be written in conventional procedural programming languages, such as, for example, the C or C# programming languages or an engineering prototyping language such as, for example, MATLAB®. However, the concepts can be replicated for many platforms provided that an appropriate compiler is used.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified.

The method of image matching is depicted with reference character 100 in FIG. 1B and includes inputting the pixilated (digital) test and plurality of known subjects of interest (task 102). The image matching tool 18 from FIG. 1A is a non-transitory electronic-processor-readable medium having a plurality of stored electronic processor executable instructions. The image matching tool 18, when executed by the electronic processor 12, causes the electronic processor to build a generative uniform background model of the test image 16 and the plurality of images of known objects of interest 14.

The generative uniform background model is depicted in tasks 104 & 106. The SIFT descriptor is a smoothed and weighted 3D histogram of gradient orientations. For any patch J, a gradient vector field ∇J is formed. The grid Λ is defined, which determines the bin centers $x_i$, $y_j$, $\theta_k$ of the histogram and has size $n(x) \times n(y) \times n(\theta)$. In typical implementations, Λ is chosen to have 4×4 spatial bins and 8 angular bins. With x=(x,y) and l=(i,j,k)∈Λ, a single, pre-normalized spatial bin of the SIFT descriptor can be written as the integral expression:

$$d(l|J) = \int g_\sigma(x) \omega_\alpha(\angle \nabla J(x)) w_{ij}(x) \|\nabla J(x)\| dx, \quad \text{(Equation 1)}$$

where $w_{ij}(x) = w(x-x_i)w(y-y_j)$. The weight function $w_{ij}$ is a bilinear interpolation with w(z)=max $$\left(0, 1 - \frac{n(z)}{2\lambda_{patch}}|z|\right);$$

and $w_\alpha(\theta)$=max $$\left(0, 1 - \frac{n(\theta)}{2\pi}|\theta_k - \theta \bmod 2\pi|\right)$$

is an angular interpolation.

The parameter $\lambda_{patch}$ is the radius of such that the patch has dimensions of $2\lambda_{patch} \times 2\lambda_{patch}$. The histogram samples are also weighted by a Gaussian density function $g_\sigma(x)$, the purpose of which is to discount the contribution of samples at the edge of the patch with the goal to reduce boundary effects. SIFT descriptors are built using Equation 1.

In task 104, a feature detector produces a set of feature frames. The feature detector is a scale invariant feature transform (SIFT) that can be detected across the test image and the plurality of images of known objects of interest, which together are sometimes referred to as corresponding image pairs.

The image matching problem can be separated into two parts: feature detection and feature description. The goal of a feature detector is to produce a set of stable feature frames that can be detected reliably across corresponding image pairs. The goal of the descriptor is to distinctly represent the image content of the normalized patch in a compact way.

In an effort to construct a descriptor to be robust to non-linear contrast changes, current clamping methodology thresholds the bin magnitudes of the descriptor, where the threshold was defined as:

$$d_c(l) = \min(d(l), c\|d\|), \quad \text{(Equation 2)}$$

with the threshold parameter, c, set to 0.2, which is a default setting. Clamping also increases the general matching performance of the descriptor, observed to be 14.4% compared to the performance without clamping on the Oxford publicly-available images dataset. This occurs even when there exists consistent lighting conditions between image pairs. The threshold parameter of c=0.2 is set rather arbitrarily and is fixed for every descriptor. However, embodiments apply an automatic threshold that is allowed to vary for every descriptor, which significantly improves the performance of the SIFT descriptor for image matching problems.

A normalized patch, J(x,y), is sampled in every descriptor built. This is done for each image (the test images and the database images, i.e. the test and comparison image). A determination of how to sample a normalized patch, J(x,y) is performed. A construction of a local feature descriptor, d, built for the normalized patch, J(x,y) is performed. The descriptor, d, represents the image content of the normalized patch, J(x,y)(task 106). The image content is based on the gradient orientations and magnitudes. The unique bin magnitude threshold descriptor is an interest point defined by position, scale, and orientation in the test image and the plurality of known objects of interest. The SIFT features from the test image and the plurality of known objects of interest are extracted and task 108 is executed. In task 108, a meaningful clamping instruction task is performed on the normalized patch of both images (both the test image and the database image). The meaningful clamping threshold can be provided as output.

In FIG. 2, the meaningful clamping instruction task 108 is shown in greater detail. The bins of the SIFT descriptor represent the underlying content of a local image patch. We wish to detect when geometric structure is present in the patch. This is indicated by the observation of large descriptor bin values. This amounts to detecting significant bins by computing a perception threshold for each descriptor and using that as the clamping limit. The idea is that once bins reach the perception threshold, little information is gained by exceeding this value. Embodiments use a contrario methodology to compute descriptor perception thresholds. The methodology is based on applying a mathematical foundation to the concept of the Helmholtz principal, which states "we immediately perceive whatever could not happen by chance." Thus, the term "large" with respect to descriptor bin values is based on the expected number of occurrences of that bin value that had been generated by a random descriptor is less than and is unlikely to have occurred by random chance. Therefore, some underlying structure is driving the perceived event.

Instead of trying to define a priori the structure of the underlying image content, which is an impossible task for general natural images, embodiments instead define what it means to have a lack of structure. Using the Helmholtz principal, lack of structure is modeled as uniform randomness, referred to as the uniform background model, or the null hypothesis $H_0$. It is assumed that the descriptor has been generated from $H_0$. It is assumed that the descriptor has been generated from $H_0$, and claim a detection, i.e. significant geometric content is present, when there is a large deviation from $H_0$. The geometric content in the image is a physical object, such as a corner of a physical object in the image. If the observed event is extremely unlikely to have been generated from this background model, the event is claimed as meaningful because it could not have occurred by random chance.

Task 202 constructs a histogram grid, Λ, associated with the descriptor d, which represents a set of connected bins L, with $L=n(x)n(y)n(\theta)$, such that every bin l=(i,j,k)∈Λ, contains a number of sample counts d(l), and a neighborhood $C_l \subset \Lambda$ of bins, for which l is connected. As used, n(x)n(y) n(θ) represents the number of bins in the x direction times the number of bins in the y direction times the number of bins in the theta direction. Stated another way, it is the number of bins across x times the number of bins across y times the number of bins across theta. Thus, as an example, if there are 5 bins in the x direction, 4 bins in the y direction, and 4 bins in the theta direction, then L=(5)(4)(4)=80 connected bins. The neighborhood set for each of said bin yields a circular-connected angular histogram, with spatial dimensions that are rectangular. The total number of samples is designated by M, with $M=\Sigma_l d(l)$ of the descriptor d. The total number of samples, M, is the summation of the descriptor bin values from bin l, and is not normalized, sometimes referred to as un-normalized.

The probability that a random sample is drawn in bin l, is represented by p(l), which leads to the definition of the null hypothesis for the descriptor d. Task 202 inputs the histogram. Each bin of the histogram has a value representing the number of counts in that bin. Thus, M represents the sum of all bin values for the histogram, which is the sum of the iterations in task 108.

Embodiments assign d as the SIFT descriptor built on the grid $\Lambda$. The descriptor, d, is said to be drawn from the null hypothesis, $H_0$, if every sample is independent, identically, and uniformly distributed with $$p(l) = \frac{1}{L},$$

sometimes written as p(l)=1/L for every bin l∈$\Lambda$. It follows that the probability at least d(l) samples are in bin l under the null hypothesis, with p(l)=1/L, is given by the binomial tail:

$$P[k \geq d(l) \mid H_0] = \qquad \text{(Equation 3)}$$
$$B(M, d(l), p(l)) = \sum_{k=d(l)}^{M} \binom{M}{k} p(l)^k (1 - p(l))^{M-k}.$$

When this probability becomes small, d(l) is unlikely to have occurred under the uniform background model, the null hypothesis is rejected and it is concluded that the bin l is meaningful. This results in detecting meaningful bins by thresholding the probability in Equation 3. Given the assumption that the data was drawn from the uniform background model, for any bin l the expected number of false detections can be determined, denoted as NFA for the number of false alarms, by:

$$NFA(l) = NB(M, d(l), p(l)), \qquad \text{(Equation 4)}$$

where N is the number of tests, and is typically defined as the number of all possible connected subsets of the histogram. N can be seen as a Bonferroni correction for the expected value in Equation 4.

Equation 4 leads to the definition of the meaningful bin. A bin l∈$\Lambda$ of the SIFT descriptor d is an ε-meaningful bin when NFA(l)=NB(M,d(l),p(l))<ε. Setting ε=1, and including the number of tests N, allows the threshold to scale automatically with histogram size. The setting of ε=1 can be interpreted as setting the threshold so as to limit the expected number of false detections under a uniform background model to less than one. This has two important consequences. First, for some applications, it is important for the algorithm to correctly give zero detections when no object exists. Second, this strategy gives detection thresholds that are similar to that of human perception; and the dependence on ε is logarithmic and hence very weak. For simplicity, embodiments hereafter refer to an ε—meaningful bin as a "meaningful bin."

The clamping threshold for d is set as the minimum descriptor bin value needed to be detected as a meaningful bin. For a given descriptor d, with corresponding properties M and p(l)=1/L, the clamping threshold is defined as:

$$t_d = \min\{k : NB(M,k,p(l)) < 1\}. \qquad \text{(Equation 5)}$$

The new clamped descriptor is then defined as:

$$d_t(l) = \min(t_d, d(l)), \qquad \text{(Equation 6)}$$

for every bin l∈$\Lambda$.

Task 204 determines the number of all possible aligned, connected, rectangular regions that can be assembled of a three-dimensional (3-D) histogram with dimensions of $n_x \times n_y \times n_\theta$. The number of aligned rectangular regions, $N_{Rect}$, is mathematically defined as:

$$N_{Rect} = (\tfrac{1}{8}) n(x) n(y) n(\theta)(n(x)+1)(n(y)+(n(\theta)+1), \qquad \text{(Equation 7)}$$

with $N_{Rect}$ representing a lower bound of N.

There may also be concern with respect to computing the inverse binomial tail in Equation 5. While efficient computational libraries exist to directly calculate the detection threshold, this still requires an iterative method since no closed form solution exits. The iterative method can be undesirable for certain real-time applications. Embodiments, instead create an approximation for Equation 5 by applying the bound:

$$-\frac{1}{M} \ln P[d(l) \geq rM \mid H_0] \leq \frac{(r-p)^2}{p(1-p)} + O\left(\frac{\ln M}{M}\right), \qquad \text{(Equation 8)}$$

with r=k/M. The bound in Equation 8 is valid when either of conditions (a) or (b) are satisfied. Condition (a) is p≤¼ and p≤r. Condition (b) is p≤r≤1−p. As M grows large, the $$O\left(\frac{\ln M}{M}\right)$$

term becomes small and Equation 8 converges to the central limit approximation. Using this, the detection threshold, $\tilde{t}_d$, can be determined.

Task 207 determines the probability under the uniform background model that any random sample would fall into any particular bin of the histogram. This is a uniform distribution. The determination is mathematically described by setting p(l)=1/L.

Conversions are used with the calculations in task 210 and the iterative tasks depicted in tasks 212 through 220. The conversions are mathematically represented as $$\alpha(N_{Rect}) = \sqrt{-\ln\left(\frac{1}{N\,Rect}\right)}.$$

Task 210 determines the detection threshold, $\tilde{t}_d$, which is mathematically represented as:

$$\tilde{t}_d = Mp + \alpha(N\,Rect)\sqrt{Mp(1-p)}. \qquad \text{(Equation 9)}$$

When Equation 9 is used, the descriptor is ensured to be appropriately clamped without having to determine the true number of tests, N, or iterate to find the inverse of the binomial tail. Conditions (a), (b), and the requirement that M (the total number of histogram counts) is sufficiently large in Equation 8 are very weak since for any practical implementation of the SIFT descriptor, these conditions are met. Generally, any pixilated real image has an M value that is deemed to be large enough.

In task 212, the first iteration, i, is set at zero for the first bin. The iteration occurs over the bins of the histogram. Zero indexing is used by setting the first bin that is being operated on at i=0.

Tasks 214 through 222 are directed to the iterative decisions associated with the meaningful clamping task (task 108). Task 214 determines whether every bin on the histogram has been processed. This is depicted mathematically as, when i<L, there are additional bins that have not been processed yet. The iterative tasks occur until all bins in the histogram have been processed and there no remaining bins (tasks 212 through 220).

When additional bins have not been processed, the yes branch in task 214 is followed and the decision in task 216 is performed. Task 216 determines whether i is greater than the detection threshold, $\widetilde{t_d}$, computed in task 210. When i is greater than the detection threshold, $\widetilde{t_d}$, the yes branch in task 214 is followed and task 218 is executed. Task 218 sets the bin threshold value to the detection threshold value, i= $\widetilde{t_d}$, and then indexes to the next i (the next bin), mathematically described as i=i+1 (task 220). When all the bins in the histogram have been processed, the no branch in task 214 is followed and task 222 is executed. In task 222, the descriptor is normalized to ensure that it has unit length after the thresholding processing (task 222). The normalized descriptor can also be referred to as a clamped normalized descriptor and can be provided as output. The clamped normalized descriptor lies in the set of [0, M], which can be something other than 0.2.

Figure 3:
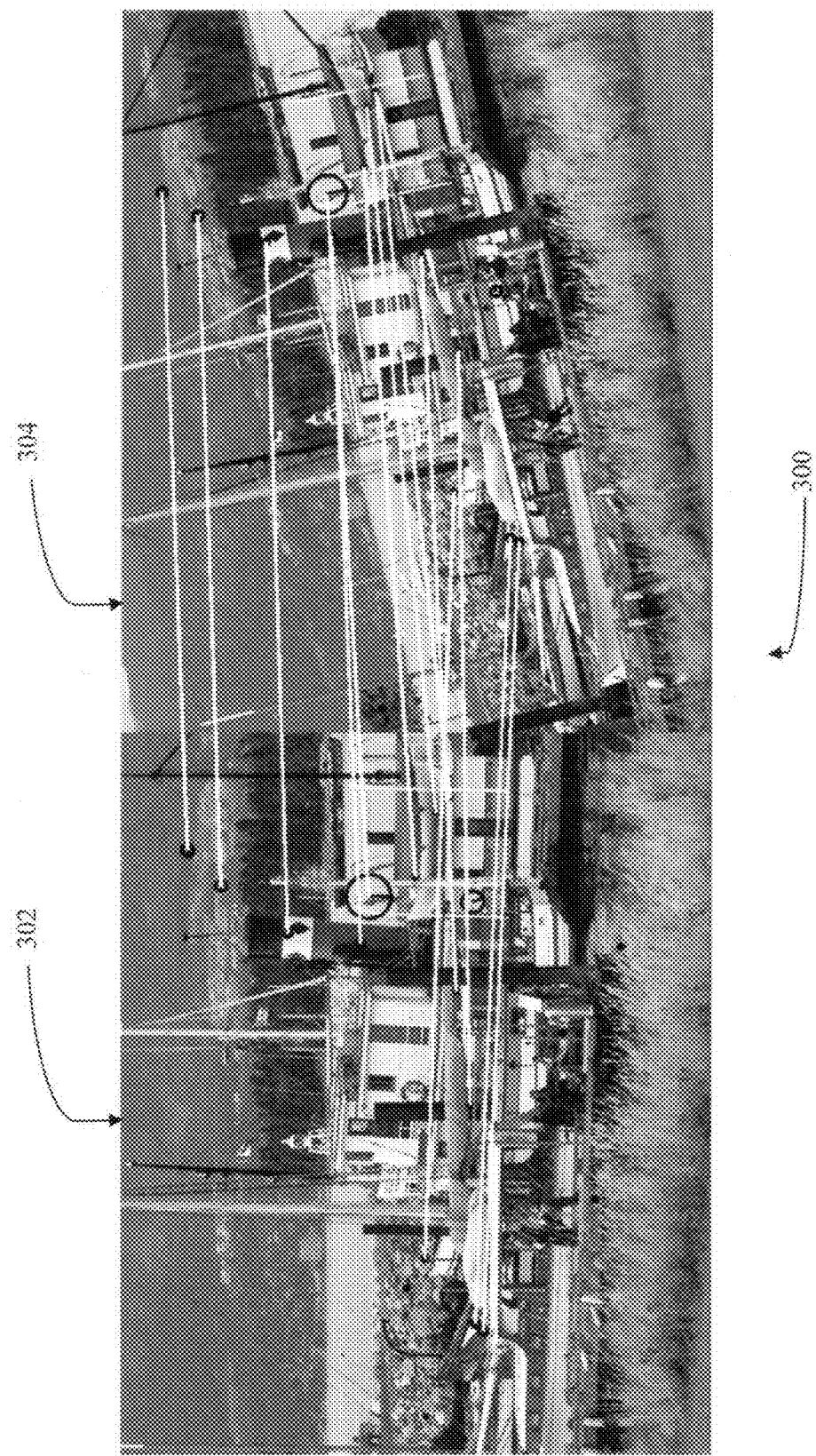
FIG. 3 is a working example, according to some embodiments, depicting feature matching of a scene depicting a boat.

FIG. 3 illustrates a working example of some embodiments and is depicted by reference character 300. In particular, FIG. 3 shows feature matching of a scene depicting a boat. Reference character 302 is used for an image of the boat taken at time $t_1$ and reference character 304 is used for an image of the boat taken at a later time, $t_2$. The image taken at time $t_1$ 302 is a known object/point of interest from the database 14, as described in relation to FIG. 1A. The image taken at a later time, $t_2$, 304 is a test image 16, as described in relation to FIG. 1A. Each image 302 & 304 in FIG. 3 is shown with exemplary features that are matched. In particular, the two images 302 & 304 are obtained from the Oxford dataset, a library of images routinely used for image analysis. The two images 302 & 304 are generated from a camera at different spatial positions. The image on the right (reference character 304) is scaled due to zoom and rotated relative to the image on the left (reference character 302). While the images 302 & 304 differ because of the scaling and rotation, they are of the same scene content. Employing the embodiments disclosed herein, black circles represent local features detected in each image. The center of the circle is the feature's detected location. A black line within the circle represents the relative orientation of the point. The size of the circle is the size of the detected scale. Features between the two images are matched when their descriptors similar. Matches can be found as nearest neighbor distance to another descriptor. The matches between feature points in the two images are shown by the white lines connecting them.

Figure 4:
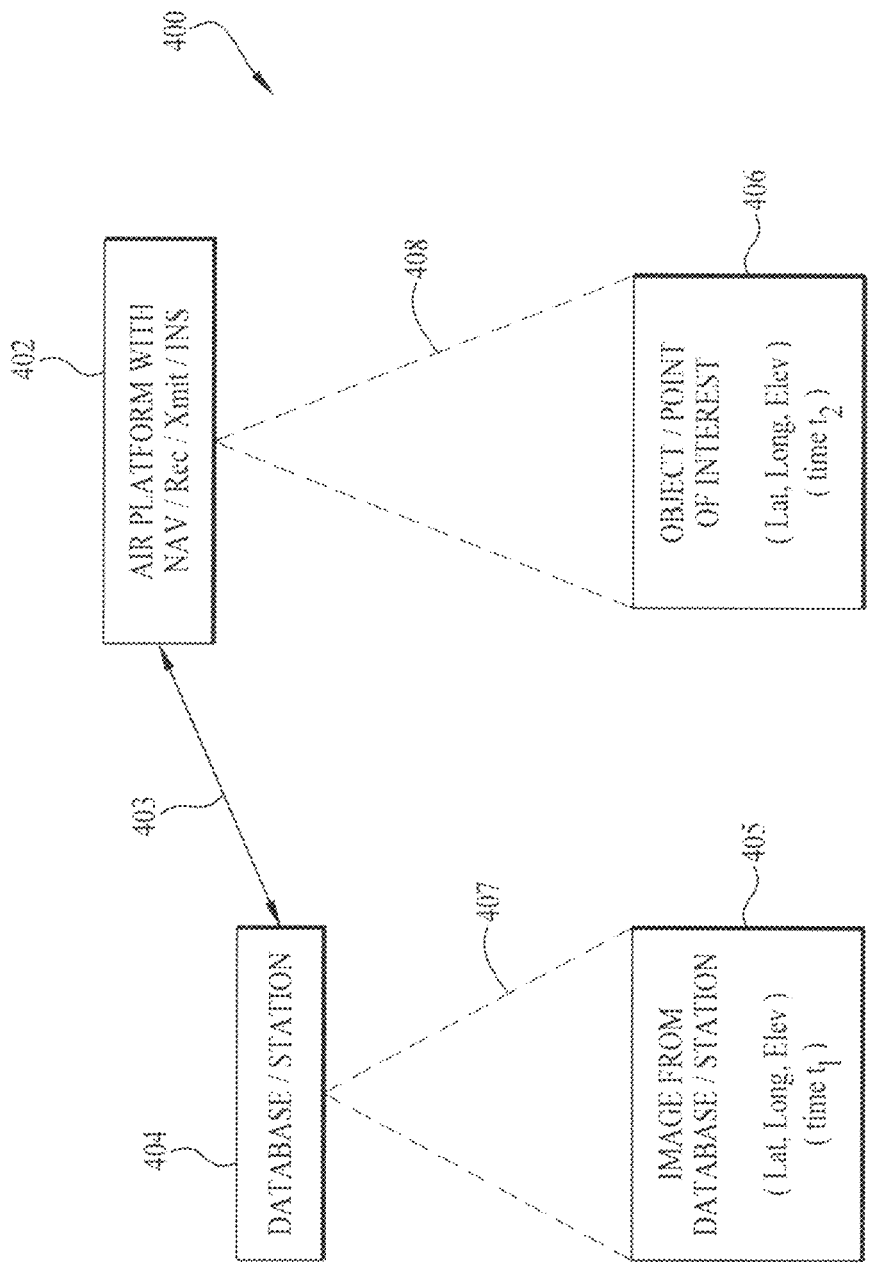
FIG. 4 illustrates an exemplary operating environment for a system, according to some embodiments.

FIG. 4 illustrates an exemplary operating environment for a system, according to some embodiments. The system is depicted using reference character 400. The system 400 is configured as discussed previously with the components and methodology depicted and described in FIGS. 1A through 3. Additionally, the system 400 is configured for use in the presence of radio frequency (RF) interference or jamming, when GPS or other signals may not be available or reliable, as well as during automatic interference monitoring and reconfiguration control such as, for example, when switching to GPS-denied operation configuration. A person having ordinary skill in the art will recognize that the term "GPS-denied environment" is used in an environment when GPS signals or other signals are not available or reliable. The system 400 in FIG. 4 is a GPS-denied environment.

FIG. 4 depicts at least one platform 402 that is configured for image-based navigation in a GPS-denied environment. Several types of platforms can be used without detracting from the merits or generality of the embodiments. The platform 402 can be air-based, sea-based, littoral zone-based, and land-based. Likewise, the platform 402 can be manned, unmanned, or a combination of both, such as when more than one platform is used. When air-based, the platform options include, but are not limited to, air vehicles, aerostats, and precision guided munitions. Embodiments are also applicable to rockets and space vehicles.

The platform 402 is configured with a computer having a non-transitory computer readable medium, a camera, and communications equipment to communicate with an operations center 404. The double arrow 403 between the platform 402 and the operations center 404 is used to depict the communication network between the platform and operations center. The operations center 404 can be air-based, sea-based, littoral zone-based, and land-based, and can be referred to as a processing station. The operations center 404 can also be referred to as a station, database or, in conjunction with FIG. 1A, the database having the plurality of images of known points of interest 14. Likewise, the operations station 404 can also be referred to as a control, monitoring, and processing station.

As shown in FIG. 4, the platform 402, in conjunction with the operations center 404, can navigate to an object/point of interest from an image 406 displaying the object/point of interest using the disclosed image-matching methodology by comparing the image displaying with object/point of interest with a database image 405 of a location of a known object/point of interest. The database image 405 can be referred to as a first image. The image of the object/point of interest 406 can be referred to as a second image or later image. The database image 405 in FIG. 4 is taken at time $t_1$, while the image 406 displaying the object/point of interest is taken at a later time $t_2$. Reference character 407 is used to depict the database image 405 (the first image) being taken by a camera, and stored in/obtained from the operations center/database 404. The later image 406, taken at time $t_2$, can be a real-time image that is compared with the database image 405. Reference character 408 depicts the second image 406 being taken by the camera in the platform 402.

The operations center 404 includes a computer having a non-transitory computer readable medium. The operations center 404 can be used for a host of activities including synthesizing data, controlling platforms 402, processing information, and configured as a user-in-the-loop facility having visual display screens.

The platform 402 is configured with an on-board navigation system and dedicated on-board transmitter, and dedicated on-board receiver. The dedicated on-board receiver is typically considered to be part of the on-board navigation system, whereas the dedicated on-board transmitter is typically not included as part of the on-board navigation system. An inertial navigation system (INS) is integrated with the dedicated on-board receiver in some embodiments. For ease of illustration, the on-board navigation system, dedicated on-board transmitter, and INS are not shown on the platform 402.

The object/point of interest can be a particular scene or location, as well as a scene or location that is a georeferenced image having coordinates that are based on an earthcentered, earth-fixed position such as, for example, latitude, longitude, and elevation. As shown in FIG. 4, the first image 405 from the database has a known latitude, longitude, and elevation. Image-based navigation is based on matching features in the second image 406 with the same features in the first image 405. Features between the two images are matched when their descriptors are similar. Image-based navigation is then an iterative process of processing updated second images 406 for new locations until the second image's features match the features in the first image 405. The operations center 404/database 14 a plurality of images that will be tied to latitude, longitude, and elevations. The comparison of the database images (first or earlier images) 405 have known latitude, longitude, and elevations allowing for the platform 402 to know where the later image 406 was taken based on the known latitude, longitude, and elevation. The platform 402 navigates until an image obtained by its camera (the later image 406) is determined to have matched features with the earlier (database) image 405. When a match between the two images 405 & 406 exists, the platform 402 is at the location of the earlier image having known coordinates.

Results & Evaluation

Significant testing of the embodiments were performed for several images. FIG. 3 depicts a comparison analysis of an image of a boat taken at two different times and at two different angles. Tables I & II below depict analysis results for several tested images.

The embodiment results are compared with current methods (Lowe clamping) for the Oxford data set. For reference, both the embodiments disclosed herein and the current clamping methods (the Lowe clamping method) were compared to descriptors with which no clamping was performed.

To evaluate matching performance, the comparison is performed using the Oxford dataset, which is a well-known dataset having 40 image pairs of various scene types undergoing different camera poses and transformations. These include viewpoint angle, zoom, rotation, blurring, compression, and illumination. The set contains eight categories, each of which consists of image pairs undergoing increasing magnitudes of transformations. Included with each image pair is a homography matrix, which represents the ground truth mapping of points between the images. The transformations applied to the images are real and not synthesized. The viewpoint and zoom+rotation categories are generated by focal length adjustments and physical movement of the camera. Blur is generated by varying the focus of the camera and illumination by varying the aperture. The compression set was created by applying JPEG compression and adjusting the image quality parameter. Table I below depicts the mean average precision (mAP) for each category of the Oxford dataset. The SIFT detector parameter First Octave is set to zero.

TABLE I

Mean Average Precision with First Octave Set to Zero

| CATEGORY | NO CLAMPING | LOWE CLAMPING | MEANINGFUL CLAMPING (MC) |
| --- | --- | --- | --- |
| Graffiti | 0.123 | 0.161 | 0.205 |
| Wall | 0.327 | 0.371 | 0.405 |
| Boats | 0.301 | 0.341 | 0.375 |
| Bark | 0.111 | 0.119 | 0.120 |
| Trees | 0.207 | 0.288 | 0.366 |
| Bikes | 0.414 | 0.371 | 0.496 |
| Leuven | 0.387 | 0.538 | 0.635 |

TABLE I-continued

Mean Average Precision with First Octave Set to Zero

| CATEGORY | NO CLAMPING | LOWE CLAMPING | MEANINGFUL CLAMPING (MC) |
| --- | --- | --- | --- |
| UBC | 0.558 | 0.558 | 0.615 |
| All Images | 0.303 | 0.347 | 0.402 |

Evaluating the performance of local descriptors with respect to image matching, given a pair of images, we extract SIFT features from both images. A match between two descriptors is determined when the Euclidean distance is less than some threshold t. Any descriptor match is considered a correct match if the two detected features correspond. Using the ground truth homography mapping supplied with the dataset, features are considered to correspond when the area of intersection over union is greater than 50 percent. For some value of t, recall is computed as:

$$\mathrm{recall}(t) = \frac{\text{\# correct matches}(t)}{\text{\# correspondences}}.$$

Additionally, 1−precision is computed as:

$$1 - \mathrm{precision}(t) = \frac{\text{\# false matches}(t)}{\text{\# correct matches}(t) + \text{\# false matches}(t)}.$$

The pair (recall (t), 1−precision (t)) represents a point in space. By varying t curves that demonstrate the matching performance of the descriptor can be constructed. This is called the precision recall curve. The area under the curve can be computed, producing a value called the average precision (AP). Larger AP indicates superior matching performance. The average of APs, across individual categories or the entire dataset, provides the mean average precision (mAP) used to compare clamping methods.

The AP for every image pair in the Oxford dataset is computed, each for two different parameter settings of the SIFT detector. This parameter is called FirstOctave, and both 0 and −1 are tested. Setting First Octave to −1 upsamples the image before creating the scale space, generating a great deal more features than with 0, resulting in more total matches, but with lower overall AP. Testing for this setting allows for greater scale variations between images, and is the default setting for SIFT in the Covariant Features toolbox in the VLFeat open-source library. It also shows how clamping impacts performance in large sets of SIFT points, and indicates how well the method scales with large amounts of data. For certain image pairs, the distortion between images is great enough, that little or no feature correspondences exist. Under these circumstances, no matches are found, and precision recall curves cannot be computed. When precision recall curves cannot be computed, AP is defined as zero. Table II depicts the mean average precision for each category of the Oxford dataset. The SIFT detector parameter First Octave is set to −1.

TABLE II

Mean Average Precision with First Octave Set to −1

| CATEGORY | NO CLAMPING | LOWE CLAMPING | MEANINGFUL CLAMPING (MC) |
|---|---|---|---|
| Graffiti | 0.016 | 0.035 | 0.110 |
| Wall | 0.230 | 0.270 | 0.320 |
| Boats | 0.054 | 0.118 | 0.244 |
| Bark | 0.049 | 0.063 | 0.068 |
| Trees | 0.043 | 0.096 | 0.173 |
| Bikes | 0.141 | 0.112 | 0.185 |
| Leuven | 0.115 | 0.210 | 0.365 |
| UBC | 0.215 | 0.305 | 0.411 |
| All Images | 0.108 | 0.152 | 0.234 |

TABLE I compares the mAP for each category in the Oxford dataset when the SIFT FirstOctave is set to 0. The embodiments disclosed herein (MC) systematically outperforms Lowe clamping for every image transform type. It also shows that clamping can improve matching performance in general image pairs, not just in cases of significant illumination differences. The leuven category of lighting shows an impressive 18.2 percent improvement, but does not exhibit the greatest gain, which occurred in bikes (blur) at 33.6 percent. The method shows remarkable performance on blurred images, with trees improving 27.0 percent. The bark (zoom+rotation) had the least improvement at 1.4 percent. However, it should be noted that it could be an artifact of the SIFT detector which extracted few correct correspondences for this category. Boats, which also varied zoom+rotation, had a 9.9 percent increase. The mean AP for all image pairs of the Oxford dataset improved by 15.9 percent compared to Lowe clamping.

For large scale experiments with the First Octave parameter set to −1, as shown in TABLE II, the performance jumps dramatically. The improvement in matching increases as the number of points increases. The category exhibiting the most improvement was graffiti (view-point) with a remarkable 215.2 percent increase. Again, bark had the least improvement with 7.9 percent. Even with the First Octave parameter set to −1, the SIFT detector performed poorly on the bark category and generated few correspondences, influencing the matching results as before. As a reference, boats increased by 106.9 percent. The mean AP increased by 54.0 percent for all image pairs in the dataset.

It is important to note that, while SIFT is used as the detector for the testing demonstration associated with the disclosed embodiments, the embodiments are applicable with other detectors and can be used to obtain similar results. Experiments point to the number of detected points generated as the single largest factor relating the amount of improvement over Lowe clamping. The remarkable property observed from the testing of the disclosed embodiments is that with a larger amount of detected points to match, the percentage improvement in AP increases.

While the embodiments have been described, disclosed, illustrated and shown in various terms of certain embodiments or modifications which it has presumed in practice, the scope of the embodiments is not intended to be, nor should it be deemed to be, limited thereby and such other modifications or embodiments as may be suggested by the teachings herein are particularly reserved especially as they fall within the breadth and scope of the claims here appended.

What is claimed is:

1. A system for image matching using local image descriptors thresholding, comprising:
at least one electronic processor having a central processing unit;
at least one database having at least one image of a known object of interest, wherein said at least one database is associated with said at least one electronic processor, wherein said at least one image of a known object of interest is pixilated;
at least one test image of a new object of interest, wherein said at least one test image is a pixilated image configured for input into said at least one electronic processor;
an image matching tool associated with said at least one electronic processor, said image matching tool configured to determine a unique bin magnitude threshold descriptor for said at least one test image and said at least one image of a known object of interest, wherein said image matching tool is configured to provide a classification match of said at least one test image to one of said at least one image of a known object of interest;
wherein said image matching tool builds a generative uniform background model of said at least one test image and said at least one image of a known object of interest, said generative uniform background model, comprising:
a feature detector, wherein said feature detector is a scale invariant feature transform (SIFT) that can be detected across said at least one test image and said at least one image of a known object of interest;
a sample of a normalized patch, in each of said at least one test image and said at least one image of a known object of interest, wherein said sample of said normalized patch in said at least one test image and said sample of a normalized patch in said at least one image of a known object of interest is used to construct a local feature descriptor, d, to determine when image content is present in said sample of a normalized patch in said at least one test image and said sample of a normalized patch in said at least one image of a known object of interest;
wherein a clamping threshold, $t_d$, is determined, wherein said clamping threshold, $t_d$, represents the image content of said sample of a normalized patch in said at least one test image and said sample of a normalized patch in said at least one image of a known object of interest; and
at least one device associated with said at least one electronic processor configured to output in a tangible medium said classification match.

2. The system according to claim 1, wherein said unique bin magnitude threshold descriptor is an interest point defined by position, scale, and orientation in said at least one test image and said at least one image of a known object of interest.

3. The system according to claim 2, wherein said image matching tool is a non-transitory electronic-processor-readable medium having a plurality of electronic processor executable instructions stored thereon, that when executed by said at least one electronic processor, causes said at least one electronic processor to:
input said at least one test image into said at least one electronic processor;
extract SIFT features from each image in said at least one test image and said at least one image of a known object of interest;

perform a meaningful clamping instruction task on the normalized patch in said at least one test image and the normalized patch in said at least one image of a known object of interest; and determine a meaningful clamping threshold and outputting said meaningful clamping threshold.

4. The system according to claim 3, wherein said meaningful clamping instruction task, further comprising:

constructing a histogram grid, $\Lambda$, associated with said descriptor d, representing a set of connected bins L, wherein $L=n(x)n(y)n(\theta)$, such that every bin l contains a number of sample counts d(l), and a neighborhood set $C_l \subset \Lambda$ of bins, for which l is connected, wherein said neighborhood set for each of said bin yields a circular-connected angular histogram having spatial dimensions that are rectangular, where n(x) is the number of bins in the x direction, n(y) is the number of bins in the y direction, and n($\theta$) is the number of bins in the $\theta$ direction;

determining a total number of samples, M, wherein $M=\Sigma_l d(l)$ of said descriptor d and setting p(l) as the probability that a random sample is drawn in bin l;

determining the number of aligned and connected rectangular regions, $N_{Rect}$, that can be assembled of a three-dimensional (3-D) histogram with dimensions of $n_x \times n_y \times n_\theta$, wherein $N_{Rect}=(\frac{1}{8})n(x)n(y)n(\theta)(n(x)+1)(n(y)+1)(n(\theta)+1)$ in said histogram grid, $\Lambda$;

determining the probability, p(l), that a random sample is drawn in bin l by setting p(l)=1/L;

determining a detection threshold, $\widetilde{t_d}$, wherein said detection threshold is mathematically determined by, $$\widetilde{t_d} = Mp + \alpha(NRect)\sqrt{Mp(1-p)}, \text{ where } \alpha(N_{Rect}) = \sqrt{-\ln\left(\frac{1}{NRect}\right)}; \text{ and}$$

setting i=0 on the first determination of the first bin, l, of said meaningful clamping instruction task.

5. The system according to claim 4, said meaningful instruction clamping task, further comprising:

determining whether every bin on said histogram has been processed;

wherein when additional bins exist that have not been processed, determining whether i is greater than said detection threshold, $\widetilde{t_d}$;

wherein when i is greater than said detection threshold, $\widetilde{t_d}$, setting the bin value to said detection threshold value, $\widetilde{t_d}$, and indexing to the next iteration, i, wherein the next iteration is i=i+1, and processing the next bin;

when all bins in said histogram have been processed, normalizing the descriptor, d, to ensure that the descriptor, d, has unit length.

6. A method for image matching using local image descriptors thresholding using an electronic processor having a central processing unit, comprising:

providing at least one electronic processor having a central processing unit;

providing at least one database having at least one image of a known object of interest, wherein said at least one database is associated with said at least one electronic processor, wherein said at least one image of a known object of interest is pixilated;

inputting at least one test image of a new object of interest into said electronic processor, wherein said at least one test image is a pixilated image;

providing an image matching tool associated with said at least one electronic processor, said image matching tool configured to determine a unique bin magnitude threshold descriptor for said at least one test image and said at least one image of a known object of interest, and providing a classification match of said at least one test image to one of said at least one image of a known object of interest;

wherein said image matching tool is a non-transitory electronic-processor-readable medium having a plurality of electronic processor executable instructions stored thereon, that when executed by said at least one electronic processor, causes said at least one electronic processor to build a generative uniform background model of said at least one test image and said at least one image of a known object of interest, said generative uniform background model, comprising:

a feature detector, wherein said feature detector is a scale invariant feature transform (SIFT) that can be detected across said at least one test image and said at least one image of a known object of interest;

a sample of a normalized patch, in each of said at least one test image and said at least one image of a known object of interest, wherein said sample of said normalized patch in said at least one test image and said sample of a normalized patch in said at least one image of a known object of interest is used to construct a local feature descriptor, d, to determine when image content is present in said sample of a normalized patch in said at least one test image and said sample of a normalized patch in said at least one image of a known object of interest:

wherein a clamping threshold, $t_d$, is determined, wherein said clamping threshold, $t_d$, represents the image content of said sample of a normalized patch in said at least one test image and said sample of a normalized patch in said at least one image of a known object of interest; and outputting said classification match in a tangible medium.

7. The method according to claim 6, wherein said unique bin magnitude threshold descriptor is an interest point defined by position, scale, and orientation in said at least one test image and said at least one image of a known object of interest.

8. The method according to claim 7, wherein said image matching tool is a non-transitory electronic-processor-readable medium having a plurality of electronic processor executable instructions stored thereon, that when executed by said at least one electronic processor, causes said at least one electronic processor to:

input said at least one test image into said at least one electronic processor;

extract SIFT features from each image in said at least one test image and said at least one image of a known object of interest;

perform a meaningful clamping instruction task on the normalized patch in said at least one test image and the normalized patch in said at least one image of a known object of interest; and determine a meaningful clamping threshold and output said meaningful clamping threshold.

9. The method according to claim 8, said meaningful clamping instruction task, further comprising:

constructing a histogram grid, Λ, associated with said descriptor d, representing a set of connected bins L, wherein L=n(x)n(y)n(θ), such that every bin l contains a number of sample counts d(l), and a neighborhood set $C_l \subset \Lambda$ of bins, for which l is connected, wherein said neighborhood set for each of said bin yields a circular-connected angular histogram having spatial dimensions that are rectangular, where n(x) is the number of bins in the x direction, n(y) is the number of bins in the y direction, and n(θ) is the number of bins in the θ direction;

determining a total number of samples, M, wherein M=$\Sigma_l$d(l) of said descriptor d and setting p(l) as the probability that a random sample is drawn in bin l;

determining the number of aligned and connected rectangular regions, $N_{Rect}$, that can be assembled of a three-dimensional (3-D) histogram with dimensions of $n_x \times n_y \times n_\theta$, wherein $N_{Rect}$=(⅛)n(x)n(y)n(θ)(n(x)+1)(n(y)+1)(θ)+1) in said histogram grid, Λ;

determining the probability, p(l), that a random sample is drawn in bin l by setting p(l)=1/L;

determining a detection threshold, $\widetilde{t_d}$, wherein said detection threshold is mathematically determined by, $$\widetilde{t_d} = Mp + \alpha(NRect)\sqrt{Mp(1-p)}, \text{ where } \alpha(N_{Rect}) = \sqrt{-\ln\left(\frac{1}{NRect}\right)}; \text{ and}$$

setting i=0 on the first determination of the first bin, l, of said meaningful clamping instruction task.

10. The method according to claim 9, said meaningful instruction clamping task, further comprising:
determining whether every bin on said histogram has been processed;
wherein when additional bins exist that have not been processed, determining whether i is greater than said detection threshold, $\widetilde{t_d}$;
wherein when i is greater than said detection threshold, $\widetilde{t_d}$, setting the bin value to said detection threshold value, $\widetilde{t_d}$, and indexing to the next iteration, i, wherein the next iteration is i=i+1, and processing the next bin;
when all bins in said histogram have been processed, normalizing the descriptor, d, to ensure that the descriptor, d, has unit length.

11. A non-transitory electronic-processor-readable medium having a plurality of electronic processor executable instructions stored thereon that, when executed by an electronic processor, causes the electronic processor to perform a method of image matching, the method comprising:
inputting at least one test image of a new object of interest into an electronic processor, wherein said at least one test image is a pixilated image;
determining a unique bin magnitude threshold descriptor for said at least one test image and a at least one image of a known object of interest stored in a database associated with said electronic processor;
determining a classification match of said at least one test image to one of said at least one image of a known object of interest;
building a generative uniform background model of said at least one test image and said at least one image of a known object of interest, said generative uniform background model, comprising:

a feature detector, wherein said feature detector is a scale invariant feature transform (SIFT) that can be detected across said at least one test image and said at least one image of a known object of interest;
a sample of a normalized patch, in each of said at least one test image and said at least one image of a known object of interest, wherein said sample of said normalized patch in said at least one test image and said sample of a normalized patch in said at least one image of a known object of interest is used to construct a local feature descriptor, d, to determine when image content is present in said sample of a normalized patch in said at least one test image and said sample of a normalized patch in said at least one image of a known object of interest;
wherein a clamping threshold, $t_d$, is determined, wherein said clamping threshold, $t_d$, represents the image content of said sample of a normalized patch in said at least one test image and said sample of a normalized patch in said at least one image of a known object of interest; and
outputting said classification match in a tangible medium.

12. The non-transitory electronic processor readable medium according to claim 11, wherein said unique bin magnitude threshold descriptor is an interest point defined by position, scale, and orientation in said at least one test image and said at least one image of a known object of interest.

13. The non-transitory electronic processor readable medium according to claim 12, said plurality of electronic processor executable instructions, when executed by said electronic processor, causes said electronic processor to:
extract SIFT features from each image in said at least one test image and said at least one image of a known object of interest;
perform a meaningful clamping instruction task on the normalized patch in at least one test image and the normalized patch in said at least one image of a known object of interest; and
determine a meaningful clamping threshold and output said meaningful clamping threshold.

14. The non-transitory electronic processor readable medium according to claim 13, wherein said meaningful clamping instruction task, when executed by said electronic processor, causes said electronic processor to:
construct a histogram grid, Λ, associated with said descriptor d, representing a set of connected bins L, wherein L=n(x)n(y)n(θ), such that every bin l contains a number of sample counts d(l), and a neighborhood set $C_l \subset \Lambda$ of bins, for which l is connected, wherein said neighborhood set for each of said bin yields a circular-connected angular histogram having spatial dimensions that are rectangular, where n(x) is the number of bins in the x direction, n(y) is the number of bins in the y direction, and n(θ) is the number of bins in the θ direction;
determine a total number of samples, M, wherein M=$\Sigma_l$d(l) of said descriptor d and setting p(l) as the probability that a random sample is drawn in bin l;
determine the number of aligned and connected rectangular regions, $N_{Rect}$, that can be assembled of a three-dimensional (3-D) histogram with dimensions of $n_x \times n_y \times n_\theta$, wherein $N_{Rect}$=(⅛)n(x)n(y)n(θ)(n(x)+1)(n(y)+1)(n(θ)+1) in said histogram grid, Λ;
determine the probability, p(l), that a random sample is drawn in bin l by setting p(l)=1/L;

determine $$\alpha(N_{Rect}) = \sqrt{-\ln\left(\frac{1}{NRect}\right)};$$

determine a detection threshold, $\widetilde{t_d}$, wherein said detection threshold is mathematically determined by, $$\widetilde{t_d} = Mp + \alpha(NRect)\sqrt{Mp(1-p)}, \text{ where } \alpha(N_{Rect}) = \sqrt{-\ln\left(\frac{1}{NRect}\right)}; \text{ and}$$

set i=0 on the first determination of the first bin, 1, of said meaningful clamping instruction task.

15. The non-transitory electronic processor readable medium according to claim 14, wherein said meaningful clamping instruction task, when executed by said electronic processor, causes said electronic processor to:
 determine whether every bin on said histogram has been processed;
 wherein when additional bins exist that have not been processed, determining whether i is greater than said detection threshold, $\widetilde{t_d}$;
 wherein when i is greater than said detection threshold, $\widetilde{t_d}$, setting the bin value to said detection threshold value, $\widetilde{t_d}$, and indexing to the next iteration, i, wherein the next iteration is i=i+1, and processing the next bin;
 when all bins in said histogram have been processed, normalizing the descriptor, d, to ensure that the descriptor, d, has unit length.

\* \* \* \* \*